No. 779,206. PATENTED JAN. 3, 1905.
F. E. CASE.
CONTROL SYSTEM.
APPLICATION FILED SEPT. 24, 1903.

Witnesses.
J. Ellis Glenn.
Helen Orford

Inventor.
FRANK E. CASE.
by Albert G. Davis
Atty.

No. 779,206. Patented January 3, 1905.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

CONTROL SYSTEM.

SPECIFICATION forming part of Letters Patent No. 779,206, dated January 3, 1905.

Application filed September 24, 1903. Serial No. 174,388.

*To all whom it may concern:*

Be it known that I, FRANK E. CASE, a citizen of the United States, residing at Schenectady, county of Schenectady, State of New York, have invented certain new and useful Improvements in Control Systems, of which the following is a specification.

My invention relates to systems of control for electrical apparatus, and more particularly to the control of a plurality of motors mounted on cars which are coupled together to form a train.

In systems of motor control in which motor-controllers of the separately-actuated contact type are employed it has been suggested to use a control system comprising a plurality of conductors, either pipes for compressed fluid or wires for electric current, to which the actuating means of the motor-controller contacts are connected, the said conductors being so arranged that their connection to a source of power or their energization is under the control of a master-controller located at any desired point. It has also been suggested to divide each motor-controller into series-parallel-controlling contacts and resistance-varying contacts and to so organize the system that to produce a certain number of resistance steps either during acceleration in series or in parallel a corresponding number of conductors are employed and that practically the same conductors are used to control the resistance-varying contacts when the motors are connected in series that are used when the motors are connected in parallel.

It is the object of my invention to simplify the control system through which the operation of the controller-contacts is secured, and I accomplish this result by so organizing the system that it may be utilized for the operation of other controller-contacts or circuit-controlling devices after the contacts or devices to which it is first operatively connected have been actuated.

In the particular type of system illustrated in the present application, in which the controller-contacts are actuated by electromagnets having their actuating-coils connected in circuit with a plurality of conductors or train-wires leading to a master-controller, an application of the improvements constituting my present invention results in reducing the size of the master-controller and lessening the number of conductors or train-wires required to operate the controller-contacts to produce a certain number of resistance steps; and in one of its aspects my invention consists in applying to such a system means for disconnecting a train-conductor from the circuit-controlling device with which it is first connected and connecting it to another circuit-controlling device, so that the second time said conductor is connected to a source of power a device separate and distinct from the one operated when the said conductor is first connected to the source of power is operated. When two resistance-controlling contacts are operated in this way through a single conductor, an additional resistance step during the acceleration of the motors is obtained.

In another of its aspects my invention consists of a controller comprising a plurality of groups of separately-actuated contacts in combination with a control system therefor constructed and arranged to secure the operation of the contacts of one group and means for operatively connecting said control system to another group of contacts.

More specifically considered, my invention consists of the combination of a plurality of motor-controllers of the separately-actuated contact type, each controller having a plurality of groups of resistance-varying electromagnetically-actuated contacts, a controlling-switch for connecting the actuating-coils of the contacts of a certain group in each motor-controller successively in circuit through certain of the train-wires, also means, such as an electromagnetically-actuated relay, for connecting the same train-wires which were previously used to operate the contacts of said group in each controller to the actuating-coils of the contacts of the next group in each controller, so that the contacts of the latter group will be operated successively when said controlling-switch is moved through its operative positions a second time, and, furthermore, comprises means for completing a maintaining circuit or circuits through the actuating-coils of the operated contacts of the previous group or groups, so as to maintain said contacts in their operated position during the time that the contacts in the succeeding group or groups are being operated.

Referring to the accompanying drawings.

Figure 1:
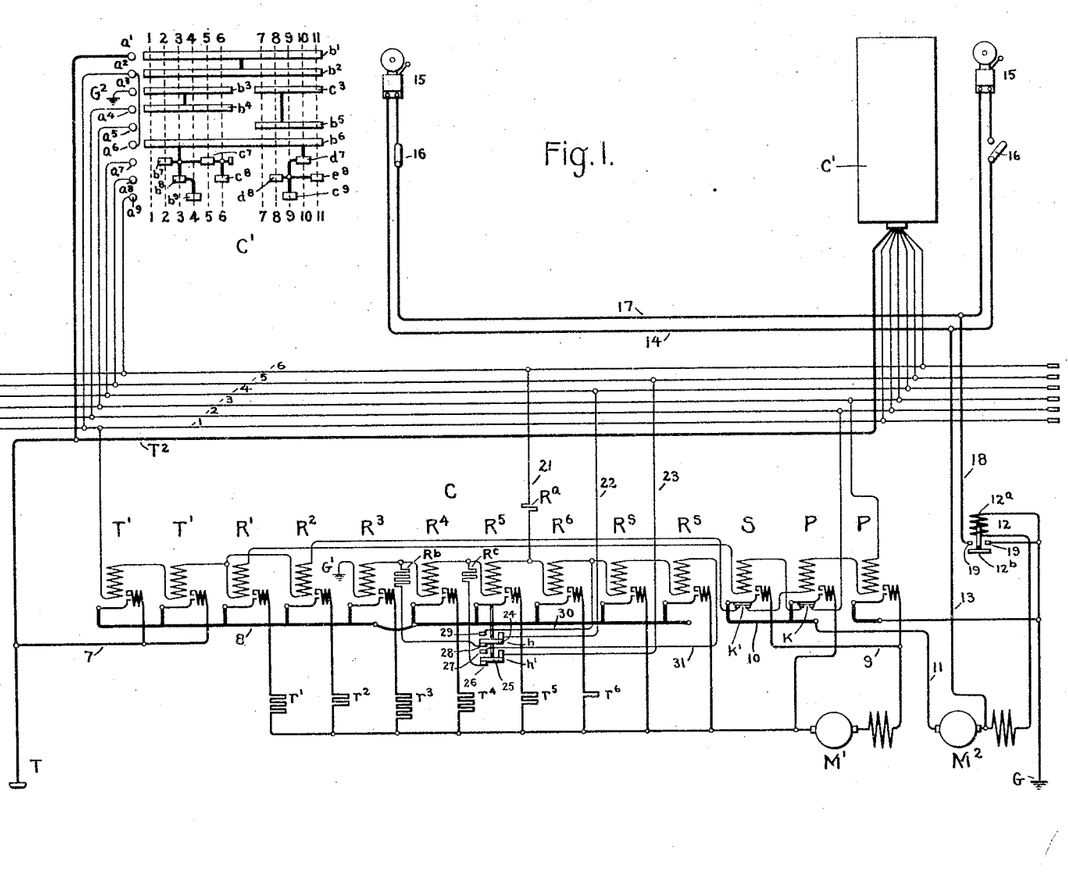
Figure 1 represents the equipment on a single car of a train-control system embodying my invention in a simple form.
Figure 8:
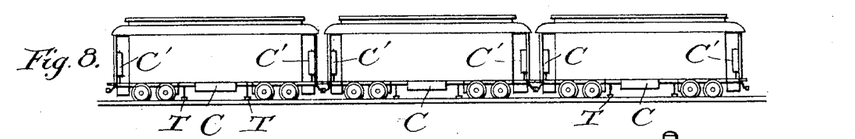
Fig. 8 illustrates diagrammatically a train of three cars equipped with my invention.

Referring now to Fig. 1, C represents a motor-controller of the separately-actuated contact type which is adapted to control the motors $M'$ and $M^2$. The contacts of said controller which control the series connection of the motors are indicated by $T'$, $T'$, $R'$, and S. The contacts which control the parallel connections of the motors are indicated by $T'$, $T'$, $R^2$, P, and P. The resistance-varying contacts are indicated by $R^3$, $R^4$, $R^5$, $R^6$, $R^s$, and $R^s$. The sections of resistance which are connected in the motor-circuit are indicated by $r'$ to $r^6$, inclusive, and the resistance-sections which are connected in the control-circuit to compensate for the resistance of the actuating-coils of the motor-controller contacts when the latter are cut out of circuit are indicated by $R^a$, $R^b$, and $R^c$. The resistance-varying contacts are adapted to be operated during acceleration in series and during acceleration in parallel by the energization of certain of the conductor or train wires 1 to 6, inclusive, as determined by the master-controllers $C'$. One of said master-controllers $C'$ is shown in development, as is customary in illustrating such a structure. The fixed contact-fingers of the master-controller $C'$ are indicated by $a'$ to $a^9$, inclusive, while the contact-segments carried by the movable member of said master-controller are indicated by $b'$ to $b^9$, inclusive, $c^3$, $c^7$, $c^8$, $c^9$, $d^7$, $d^8$, and $e^8$. The preferred relative location of the motor-controllers C, and master-controllers $C'$ on the several motor-cars of a train is clearly shown in Fig. 8. Attached to the movable member of the contact $R^5$ are auxiliary switches $h'$ and $h^4$. These auxiliary switches may be attached to other of the resistance-varying contacts, provided the proper connections are made to produce the desired results. In the system shown in this figure the auxiliary switches allow the use of the train-wires 4 and 5 twice during acceleration in series and of the train-wire 4 twice during acceleration in parallel—that is to say, the auxiliary switch $h$ allows the contact $R^3$ and the contact $R^6$ to be operated separately by successive energizations of the train-wire 4. Also the auxiliary switch $h'$ allows the use of the train-wire 5 twice during acceleration in series to operate the contacts $R^4$ when first energized and the contacts $R^s$ when energized a second time.

The auxiliary switches $h$ and $h'$, attached to the motor-controller contacts P and S, respectively, prevent the simultaneous completion of the series-control circuit and the parallel-control circuit in a manner well understood in the art. When P is closed, the switch $h$ opens the control-circuit in which the actuating-coil of the contact S is located, and the switch $h'$ opens the control-circuit in which the actuating-coils of the contacts P are located when the contact S is closed.

An overload or current-measuring coil $12^a$, located in the motor-circuit, is adapted to operate the movable contact member $12^b$ of the overload-relay 12 when a predetermined abnormal current flows through the motor-circuit. This movable member closes a shunt-circuit about the field of the motor $M^2$, and thereby operates an indicating device 15, connected in said shunt-circuit, to indicate to the motorman that an excessive current is flowing through the motor-circuit. The indicating devices 15 are located adjacent to each master-controller and are provided with cut-out switches 16.

In the operation of the system shown in Fig. 1 the movement of the master-controller through its first six operative positions causes the motors $M'$ and $M^2$ to be connected in series and the resistance-varying contacts to be operated successively to reduce the resistance of the motor-circuit. The control-circuit corresponding to the first operative position of the master-controller is as follows: starting from the trolley T, through the trolley-conductor $T^2$, contact-finger $a'$, contact-segments $b'$ and $b^2$, contact-finger $a^2$, train-wire 1, actuating-coils of the contacts $T'$ $T'$ $R'$ S, contacts of the auxiliary switch $h$, train-wire 2, contact-finger $a^4$, contact-segments $b^4$ and $b^3$, contact-finger $a^3$ to ground at $G^2$. This energizes the series-controlling contacts of the motor-controller and causes a circuit to be completed through the motors, as follows: from trolley or collector shoe T, conductor 7, contacts $T'$ and $T'$ in parallel, conductor or frame 8, contact $R'$, resistance-section $r'$, motor $M'$, conductor 9, contact S, conductor or frame 10, conductor 11, motor $M^2$, actuating-coil $12^a$ of the overload-relay 12 to ground at G. In the second position of the master-controller a control-circuit in addition to the control-circuit just traced is completed through the actuating-coil of the first resistance-varying contact, as follows: branching from the contact-finger $a^2$, through the contact-finger $a^6$, contact-segments $b^6$ and $b^7$, contact-finger $a^7$, train-wire 4, conductor 22, movable member 24 of the auxiliary switch $h$, contact 28, resistance $R^b$, actuating-coil of the contact $R^3$ to ground at G'. The completion of this circuit operates the contact $R^3$ and connects the resistance-section $r^3$ in the motor-circuit in parallel to the resistance-section $r'$, thereby reducing the resistance of said motor-circuit. A further forward movement of the master-controller into its third position causes the energization of the train-wire 5, the circuit from said train-wire 5 being readily traced, as follows: through conductor 23, movable member 25 of the auxiliary switch $h'$, contact 26, resistance $R^c$, actuating-coils of the contacts $R^4$ and $R^3$ to ground at G', thereby operating the contact $R^4$ to connect the resistance-section $r^4$ in the motor-circuit, while at the same time maintaining the contact $R^3$ in its closed position. In the fourth position of the master-controller the train-wire 6 is energized, thereby causing the actuating-coil of the contact $R^5$ to be connected in series with the actuating-coils of the contacts $R^4$ and $R^3$. The operation of the contact $R^5$ causes the movable members 24 and 25 of the auxiliary switches $h$ and $h'$, respectively, to be moved away from the contacts 28 and 26, respectively, into engagement with the contacts 29 and 27, respectively. Therefore when the master-controller is moved into its fifth position and the train-wire 4 is energized a second time a control-circuit will be completed through said train-wire 4, thence through the conductor 22, movable member 24 of the auxiliary switch $h$, contact 29, conductor 30, actuating-coils of the contacts $R^6$, $R^5$, $R^4$, and $R^3$ to ground at G'. In the sixth operative position or final series position of the master-controller the train-wire 5 is again energized, thus completing a control-circuit through said train-wire and the conductor 23, movable member 25 of the auxiliary switch $h'$, contact 27, conductor 31, actuating-coils of all of the resistance-varying contacts in series to ground at G', thereby short-circuiting the sections of resistance in the motor-circuit. The control-circuits that are completed during acceleration in parallel may readily be traced, and it is not necessary to follow said circuits out in detail.

Whenever the current which flows through the motor-circuit reaches a predetermined abnormal amount, the actuating-coil $12^a$ of the overload-relay 12 will be energized sufficiently to attract the movable member $12^b$ of said relay into engagement with the contacts 19, so as to complete a circuit in shunt to the field-coil of the motor $M^2$, through conductors 13 and 14, indicating device 15, closed cut-out switch 16, conductors 17 and 18, contacts $12^b$ and 19 to ground at G, thereby operating said indicating device 15 to serve as a warning to the motorman that the predetermined maximum current has been exceeded.

Figure 2:
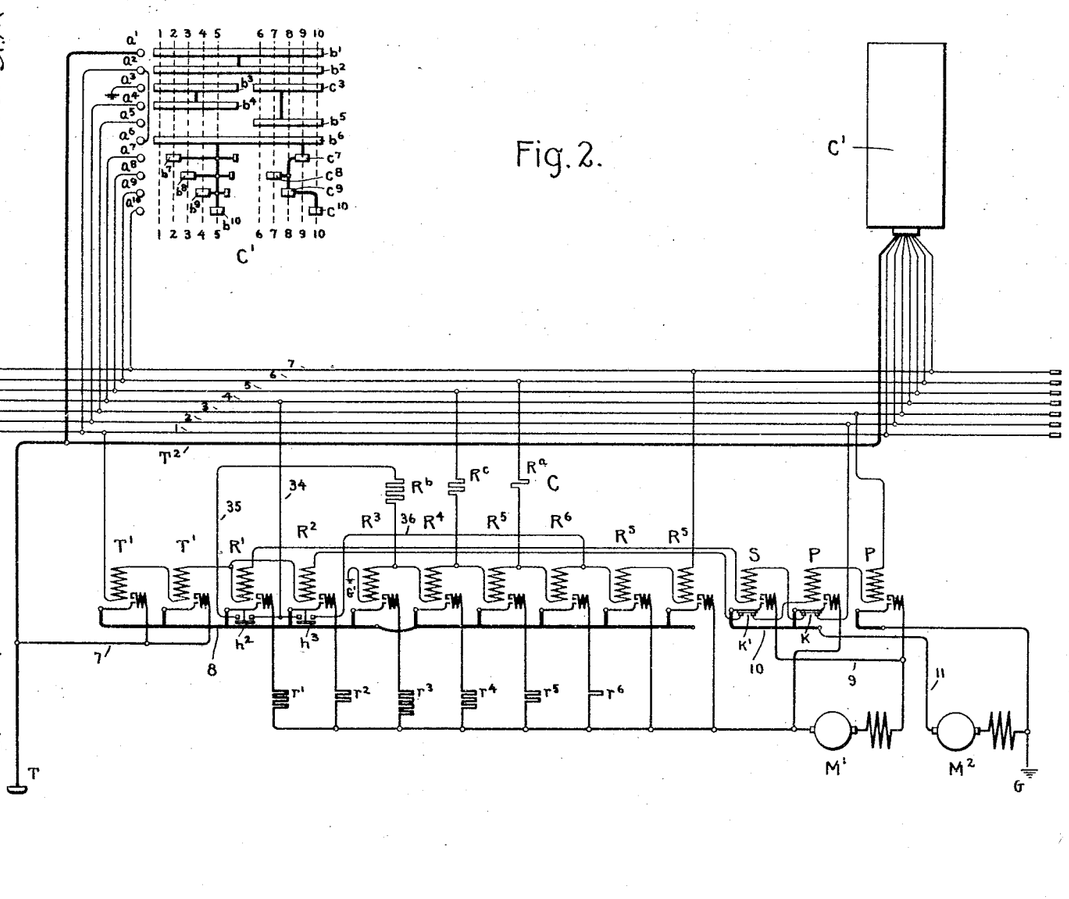
Fig. 2 is a diagrammatic representation of a modification of the system shown in Fig. 1.

In the modified form of the invention shown in Fig. 2 the parts of the system corresponding to those shown in Fig. 1 are designated by similar reference characters. In this modification the contact-fingers of the master-controller are designated by $a'$ to $a^{10}$, inclusive, the contact-segments carried by the movable member of said controller are designated by $b'$ to $b^{10}$, inclusive, $c^3$, $c^7$, $c^9$, and $c^{10}$, and the train-wires are designated by 1 to 7, inclusive. In this modification the auxiliary switches, which are used for the purpose of reducing the number of conductors or train-wires required to produce a certain number of resistance steps during acceleration of the motors, are attached to the motor-controller contacts $R'$ and $R^2$ instead of being attached to the contact $R^5$. These auxiliary switches (indicated by $h^2$ and $h^3$, respectively) allow the use of the train-wires 4 to actuate the contact $R^3$ during acceleration in series and the contact $R^6$ during acceleration in parallel, thereby producing a different combination of resistance-varying contacts in parallel from that obtained by the energization of the same train-wire during acceleration in series. This reduces the number of conductors or train-wires required to produce a certain number of resistance steps during acceleration of the motors. It is customary in the systems now in use to so proportion the resistance-sections that to produce a uniform acceleration the contacts $R^3$ and $R^4$ are operated independently and the contacts $R^6$, $R^s$, and $R^s$ are operated substantially together during acceleration in series, while during acceleration in parallel the contacts $R^3$ and $R^4$ are operated together and the contact $R^6$ is operated independently of the contacts $R^s$ and $R^s$. It has heretofore been found necessary to provide an additional train-wire and connect the same between the actuating-coils of the contacts $R^6$ and $R^5$ to obtain the same number of resistance steps throughout the acceleration of the motors which I now obtain without said additional train-wire. A more detailed description of the control system over which my present invention is intended as an improvement may be had by referring to the patent to Perry, No. 687,060, granted November 19, 1901. In the operation of this modified system when the master-controller C' is moved into its first operative position the series-controlling contacts of the motor-controller C are operated to connect the motors in series, as before described with reference to Fig. 1. In the second operative position of said master-controller the train-wire 4 is energized and a control-circuit is completed through said train-wire 4 and conductor 34, auxiliary switch $h^2$, which has been closed by the operation of the contact R', thence through conductor 35, resistance $R^b$, actuating-coil of contact $R^3$ to ground at G'. In the third and fourth positions of the master-controller the contacts $R^4$ and $R^5$ are operated successively to reduce the resistance of the motor-circuit. In the fifth or final series position the contacts $R^6$, $R^8$, and $R^8$ are simultaneously operated. In the transition position between series and parallel the control-circuits are all opened. In the first parallel position of the master-controller the contacts T", T', $R^2$, P, and P are energized and the closing of the contact $R^2$ also causes the closing of the auxiliary switch $h^3$. When the master-controller is moved into its second parallel position, or seventh operative position, the train-wire 5 is energized to cause the contacts $R^4$ and $R^3$ to be operated together. The next operative position cuts in the contact $R^5$, thereby further reducing the resistance of the motor-circuit. In the ninth operative position of the master-controller the train-wire 4 is energized, and since the switch $h^3$ is closed a circuit is completed through said train-wire 4 and the conductor 34, contacts of the auxiliary switch $h^3$, conductor 36, actuating-coils of the contacts $R^6$, $R^5$, $R^4$, and $R^3$ in series to ground at G', thereby producing a resistance step which is not produced during acceleration in series. In the next and final operative position of the master-controller the contacts $R^8$ and $R^8$ are operated together to short-circuit the resistance of the motor-circuit.

Figure 3:
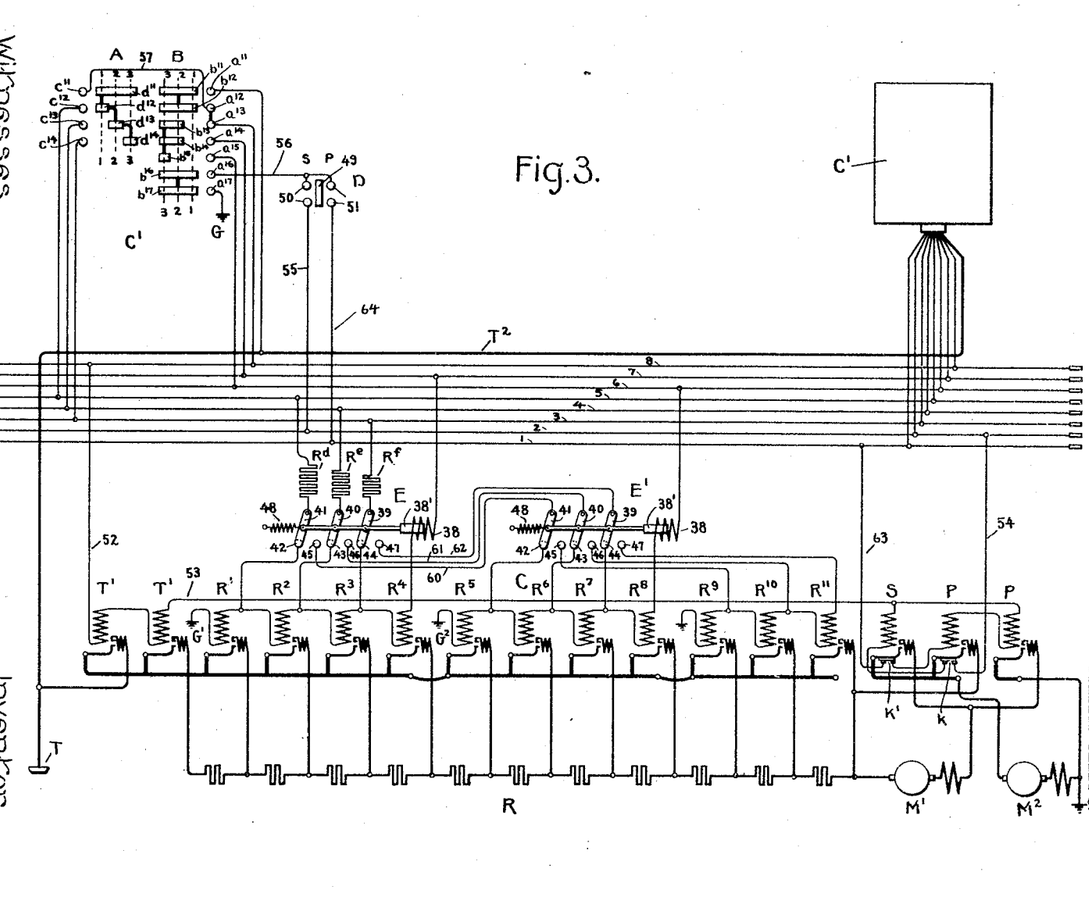
Fig. 3 is a diagrammatic representation of the equipment on a single car of a train-control system, showing a more complex but preferred embodiment of my invention.

In the system shown in Fig. 3 the motors, as before, are indicated by M' and $M^2$, the motor-controller by C, the master-controller by C', the trolley or collector shoe by T, and the trolley conductor by $T^2$. The contacts of the motor-controller which control the series connection of the motors are T" T' and S, while the contacts which control the parallel connections of the motors are T' T", P, and P. The train-wires are indicated by 1 to 8, inclusive. The resistance-sections which are connected in the control-circuits to compensate for the resistance of the actuating-coils of the motor-controller contacts when the latter are cut out of circuit are represented by $R^d$ $R^e$ $R^f$. The resistance which is cut out step by step in the motor-circuit during the acceleration of the motors in both series and parallel relationship is indicated by R. The contacts of the motor-controller which control the sections of said resistance are indicated by R' to $R^{11}$, inclusive, the said contacts being divided into groups, each group containing a predetermined number of contacts. The master-controller in this modified system includes two controlling-switches A and B and a separate series-parallel switch D, employed for the purpose of controlling the operation of the series-parallel contacts T" T', S, P, and P. The switches A and B are preferably mechanically connected together, so that the movable member of the switch A will be moved to complete a number of rotations and make the same combinations a number of times while the movable member of the switch B is passing through its full range of movement, which is a fractional part of one rotation. The contact-segments carried by the cylinder of the switch A, which in the system illustrated is geared to the cylinder of the switch B so as to make three complete rotations while said cylinder B is moving approximately two hundred and seventy degrees, are indicated by $d^{11}$ to $d^{14}$, inclusive, while the contact-fingers which engage said contact-segments are designated by $c^{11}$ to $c^{14}$, inclusive. The contact-segments of the switch B are designated by $b^{11}$ to $b^{17}$, inclusive, and the contact-fingers which engage with said contact-segments, respectively, are designated by $a^{11}$ to $a^{17}$, inclusive. The movable member of the series-parallel switch D is designated by 49. The contact-fingers of said series-parallel switch which correspond to the series position of the motor-controller are designated by 50 and those corresponding to the parallel position of the motor-controller are designated by 51. The contact-segments of the operating-switch A energize certain train-wires successively and cause the contacts of a certain group of resistance-controlling contacts of the motor-controller to be operated successively. When all the contacts of said group which are controlled by said switch are operated, the switch B is moved into its first operative position, thus causing the last contact of said group to be operated and also causing the maintaining-circuit to be completed through the actuating-coils of said contacts, whereby the contacts which have already been operated by the switch A are maintained in their closed position. The controlling-switch A is therefore ready to repeat the successive energization of the same train-wires above referred to and cause the contacts in another group to be operated successively. Immediately after said maintaining-circuit is completed the train-wires above referred to are disconnected from the actuating-coils of the contacts of said group and are connected to the actuating-coils of the corresponding contacts of the next adjacent group by means of the relay E. Each of the electromagnetically-actuated relays E and E' is made up of the solenoid 38 and the core 38', the latter being operatively connected to the movable members 39, 40, and 41, adapted to engage, respectively, with the contacts 42, 43, and 44 when in one position and with the contacts 45, 46, and 47 when in another position. The said movable members are maintained normally in engagement with the contacts 42, 43, and 44, respectively, by means of the spring 48 and are moved into engagement with the contacts 45, 46, and 47 against the action of said spring when the solenoid 38 is energized.

Figures 5, 6:
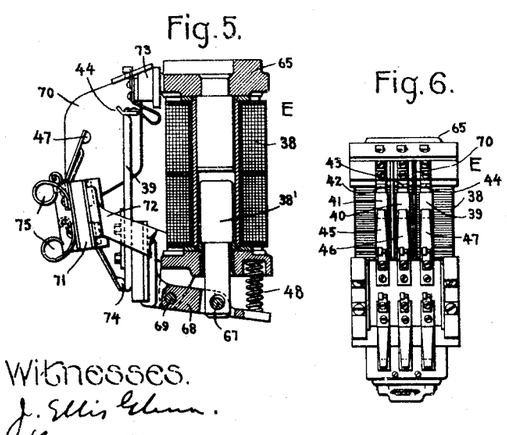
Fig. 5 is a sectional elevation of the preferred form of electromagnetically-actuated relay used in connection with the system shown in Fig. 3.
Fig. 6 is a front view of said relay.
Figure 7:
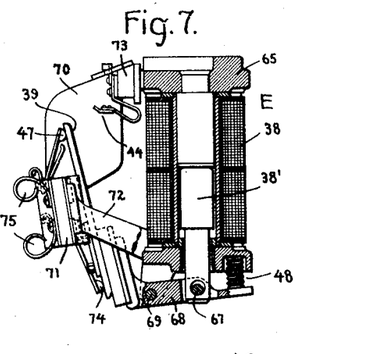
Fig. 7 is a sectional elevation of the relay, showing the relay-contacts in a different position from that shown in Fig. 5.

In Figs. 5, 6, and 7 I have shown the preferred form of the relay E. The actuating-coil 38 of said relay is mounted upon a frame 65, which may be bolted or otherwise fastened to the under side of the car-floor or in any other desired location. The core 38' of said solenoid is pivotally connected at 67 with the lever 68, pivoted at 69 in the frame 65. Said lever 68 carries at its outer end a plurality of movable switch contact members 39, 40, and 41, which are adapted when in the deënergized position of the relay to engage with the relatively fixed spring-mounted contacts 42, 43, and 44. This position of the relay is shown in Fig. 5. In the other operative position of said relay—that is, in the position assumed by said relay when the solenoid 38 is energized, as shown in Fig. 7—the movable contacts 39, 40, and 41 are in engagement with the spring-mounted contacts 45, 46, and 47. The strips 70 of insulating material are placed in the frame 65 between the contacts 42, 43, and 44 to protect said contacts from injury and also to form blow-out chutes for the arcs which tend to form at said contacts. The said insulating-pieces are supported in the frame 65 between the block 71 of insulating material carried at the outer end of the brackets 72 and the block 73, upon which the contacts 42, 43, and 44 are mounted. The contacts 45, 46, and 47 are mounted on the block 71. To avoid the use of rigidly-fastened flexible leads between the movable members 39, 40, and 41 and the fixed support, the spring-mounted contact-fingers 74 are fastened at one end to the block 71 and engage the lower ends of said movable contact members. The hook-shaped pieces 75, carried by the block 71, are for the purpose of supporting the cables or conductors which lead to and from said relays. The spring 48 tends to maintain the movable parts of the relay in the position shown in Fig. 5, the said movable parts being operated against the action of said spring by the electromagnetic attraction of the solenoid 38. Any desired number of contact-fingers or movable contact members may be carried by the lever 68.

Figure 4:
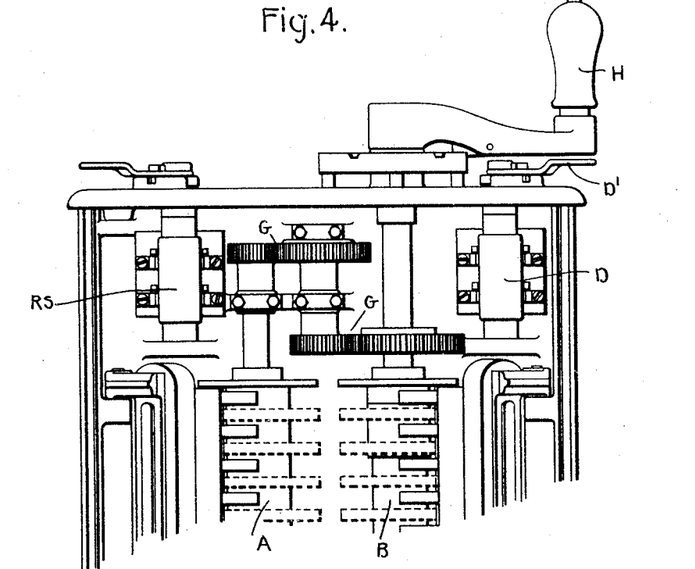
Fig. 4 is an elevation of the upper part of a master-controller used in connection with the system illustrated in Fig. 3.

Referring now to Fig. 4 of the drawings, I have indicated one form of a master-controller which may be used to perform the functions of the controller illustrated diagrammatically in Fig. 3. In this Fig. 4, A indicates the cylinder of the operating-switch of the master-controller, and B indicates the cylinder of the maintaining-switch of said controller, the said cylinders being geared to each other by means of the gearing G in such a manner that the cylinder A will rotate approximately four times as fast as the cylinder B. The handle H is provided for the purpose of operating both of the cylinders A and B. The reversing-switch in this controller is indicated by RS. The series-parallel switch D is operated by the handle D'; but, if desired, it may be connected to the operating-handle of the master-controller, so as to be operated from said handle in a manner such as is shown and described in the application of C. E. Barry, Serial No. 174,386, filed concurrently herewith.

In the operation of the system illustrated in Fig. 3 when the master-controller is moved into its first operative position either series or parallel relationship of the motors can be obtained, depending upon the position of the series-parallel switch D. Let us suppose that this series-parallel switch has been thrown into its series position with the movable member of said switch in engagement with the contact-fingers 50. Then the control-circuit corresponding to the first position of the master-controller may be traced as follows: from the trolley or collector shoe T, trolley conductor $T^2$, contact-finger $a^{11}$, contact-segments $b^{11}$ and $b^{12}$, contact-fingers $a^{12}$ and $a^{13}$, train-wire 8, conductor 52, actuating-coils of the contacts T' T' and S, auxiliary switch $k$, conductor 54, train-wire 2, conductor 55, contacts 50 and 49 of the series-parallel switch D, conductor 56, contact-finger $a^{16}$, contact-segments $b^{16}$ and $b^{17}$, contact-finger $a^{17}$, to ground at G. The completion of said circuit causes the energization of the contacts T' T' and S. A control-circuit is also completed from the contact-finger $a^{12}$ of the switch B, through conductor 57, contact-finger $c^{11}$ of the switch A, contact-segments $d^{11}$ and $d^{12}$, contact-finger $c^{12}$, train-wire 5, resistance $R^d$, member 41 of the electromagnetically-actuated relay E, contact 42, actuating-coil of the motor-controller contact R', to ground at G'. The motors are thus connected in series with each other and with the entire resistance R. In the second operative position of the master-controller the circuits completed by the hold-up switch B are unchanged while the contact $d^{13}$ of the switch A is brought into engagement with the finger $c^{13}$, thereby completing a circuit through the train-wire 4, resistance $R^e$, member 40 of the relay E, contact 43, actuating-coils of the motor-controller, contacts $R^2$ and R', to ground at G'. The third position of the master-controller causes the train-wire 3 to be energized and completes a circuit through the resistance $R^f$, member 39 of the relay E, contact 44, actuating-coils of the contacts $R^3$, $R^2$, and R' to ground at G'. The movement of the master-controller into its next operative position causes the contact-segments of the switch A to move out of engagement with its contact-fingers and causes the maintaining-switch B to assume its second operative position. In this position of the switch B a maintaining-circuit is completed from the contact-finger $a^{12}$, through the contact-finger $a^{13}$, thence through the contact-segments $b^{13}$ and $b^{14}$, contact-finger $a^{14}$, train-wire 7, solenoid 38 of the relay E, actuating-coils of the contacts $R^1$, $R^3$, $R^2$, and $R'$ in series, to ground at $G'$. The completion of this maintaining-circuit causes the said switch B to hold up the first group of motor-controller contacts already operated by the switch A, while at the same time, due to the energization of the coil 38, it causes the relay E to break the connections between the train-wires which were previously energized by the switch A and the actuating-coils of the first group of contacts and then connect said train-wires to the actuating-coils of the contacts $R^5$, $R^6$, and $R^7$ of the second group of resistance-controlling contacts of the motor-controller C through the movable members of the relay $E'$. It will thus be seen that as the master-controller is moved into its next operative position—that is, the first position of the switch A corresponding to the second position of the switch B—a circuit will be completed from the contact-finger $a^{12}$, through conductor 57, contact-finger $c^{11}$, contact-segments $d^{11}$ and $d^{12}$, contact-finger $c^{12}$, train-wire 5, resistance $R^d$, movable member 41 of the relay E, contact 45 of said relay, conductor 60, movable member 41 of the relay $E'$, contact 42 of said relay, actuating-coil of the resistance-controlling contact $R^5$, to ground at $G^2$. A further forward movement of the master-controller brings the contact-segments $d^{13}$ and $d^{14}$ successively into engagement with the contact-fingers $c^{13}$ and $c^{14}$, thereby energizing the train-wires 4 and 3 successively, so as to cause the operation of the contacts $R^6$ and $R^7$ successively. As the master-controller moves into its next operative position the contact-segments of the switch A are moved out of engagement with the contact-fingers of said switch and the switch B assumes its third operative position, thereby energizing the train-wire 6 by bringing the contact-segment $b^{15}$ into engagement with the contact-finger $a^{15}$. By the energization of said train-wire 6 a maintaining-circuit is completed through the solenoid 38 of the relay $E'$, through the actuating-coils of the resistance-controlling contacts $R^8$ $R^7$ $R^6$ $R^5$ in series, to ground at $G^2$. The completion of this circuit causes the energization of the solenoid 38 of the relay $E'$, thereby throwing the movable member, of said relay against the action of the spring 48 into engagement with the contacts 45, 46, and 47, respectively, so that when the movable member of the switch A is again moved through its operative positions the resistance-controlling contacts $R^9$, $R^{10}$, and $R^{11}$ will be successively operated.

The same number of resistance-steps as above described may also be obtained throughout the acceleration of the motors when connected in parallel, it being necessary only to move the series-parallel switch D into the position corresponding to the parallel position of the motor-controller—that is to say, to move the movable contact 49 of said switch D into engagement with the contact-fingers 51. Thus a circuit corresponding to the first parallel position of the master-controller may be traced as follows: from the trolley or collector shoe T, through the trolley conductor $T^2$, contact-finger $a^{11}$, contact-segments $b^{11}$ and $b^{12}$, contact-finger $a^{12}$, contact-finger $a^{13}$ and train-wire 8, conductor 52, actuating-coils of the contacts $T'$ $T'$, conductor 53, actuating-coils of the contacts P and P, auxiliary switch $k'$, conductor 63, train-wire 1, conductor 64, contact-fingers 51 and movable contact member 49 of the series-parallel switch, conductor 56, contact-fingers $a^{16}$ of the switch B, contact-segments $b^{16}$ and $b^{17}$, contact-finger $a^{17}$, to ground at G. The circuits through the motors corresponding to the above-indicated positions of the master-controller may readily be traced on the figure.

Although I have shown and described my invention as embodied in an electrically-operated train-control system, it is clear that the power employed need not be electric, but may, if desired, be compressed fluid or other similar power, it being merely necessary to substitute suitable conductors and actuating and controlling devices applicable to the power employed for the electrical control system comprising the conductors or train-wires and devices applicable to the electrical current as herein shown and described. It is also clear that the devices to be operated need not all be parts of the motor-controller, but that one or more of the train conductors may be used to secure the operation of any of the auxiliary devices that are required in a motor-control system either before or after said conductor or conductors are used to secure the operation of the contact or contacts of the motor-controller corresponding thereto. Also it will be seen that in the preferred embodiment of my invention certain of the conductors or train-wires may be used over and over again to operate additional resistance-controlling contacts, it being necessary only to provide a relay and an additional conductor for each additional group or division of the controller-contacts and to construct the master-controller so as to take care of said additional conductor or conductors. It will also be understood that any number of conductors may be selected to be used over and over again, provided the master-controller and relays are constructed with controlling devices corresponding in number to the desired number of contacts in a group or division of the motor-controller.

In the appended claims I aim to cover all modifications of the arrangements described herein which do not involve a departure from the spirit and scope of my invention.

What I claim as new, and desire to secure by Letters Patent of the United States, is—

1. In combination, a controller of the separately-actuated contact type, a plurality of conductors operatively connected to the circuit-controlling devices of said controller, and means for disconnecting a conductor from the circuit-controlling device with which it is first connected and then connecting it to another circuit-controlling device so that the second time said conductor is connected to a source of power a device separate and distinct from that operated when the conductor is first connected to the source of power is operated.

2. In combination, a controller of the separately-actuated contact type, a master-controller, a plurality of conductors connected with said master-controller and adapted to be connected with the circuit-controlling devices of said controller, and means independent of said master-controller for disconnecting a conductor from the circuit-controlling device with which it is first connected and then connecting it to another device so that the second time said conductor is connected to a source of power through said master-controller it will cause the operation of a device separate and distinct from that operated when the conductor is first connected to the source of power.

3. In combination, a controller of the separate electromagnetically-actuated contact type, a master-controller, a plurality of conductors connected with said master-controller and adapted to be connected to the actuating-coils of the contacts of said controller, and means independent of said master-controller for disconnecting a conductor from the actuating-coil of the contact with which it is first connected and then connecting it to the actuating-coil of another contact so that the second energization of said conductor by a movement of said master-controller will cause the operation of a contact separate and distinct from that operated when the conductor is first energized.

4. In combination, a controller of the separate electromagnetically-actuated contact type, a master-controller, a plurality of conductors connected with said master-controller and adapted to be connected to the actuating-coils of the contacts of said controller, and an auxiliary switch or switches for connecting one or more of said conductors with the actuating coil or coils of certain of the controller-contacts when in one position and for connecting the actuating coil or coils of certain other contacts to said conductor or conductors when in another position.

5. In combination, a motor-controller of the separate electromagnetically-actuated contact type, a master-controller, a plurality of conductors connected with said master-controller and adapted to be connected to the actuating-coils of the contacts of said motor-controller, and an auxiliary switch or switches independent of said master-controller and operatively connected with a motor-controller contact or contacts for connecting the actuating coil or coils of certain other contacts to said conductors.

6. In combination, a motor-controller of the separately-actuated contact type, a master-controller, a plurality of conductors connected to certain of the contact-actuating means of said motor-controller and to said master-controller, and means for changing certain of the connections between said conductors and said contacts, whereby one or more of said conductors may be energized a second time by a movement of the master-controller during acceleration of the motors in series or during acceleration in parallel to operate different contacts and produce a greater number of resistance steps in series or in parallel than the number of conductors employed.

7. In combination, a controller comprising a plurality of separately-actuated contacts, a plurality of conductors normally connected to certain of the actuating means of said contacts, and means for disconnecting one or more of said conductors from the contact-actuating means with which they are normally connected and for connecting them to other contact-actuating means so that when each conductor the connection of which has been so changed is energized, a separate and independent contact is operated.

8. In a motor-control system, a plurality of motors, a resistance, a motor-controller having a plurality of separately-actuated contacts for varying the amount of said resistance connected in circuit with the motors so as to produce a certain number of steps during acceleration in series or during acceleration in parallel, a plurality of conductors less in number than the number of resistance steps desired to be produced in series or in parallel, said conductors being so connected that when they are first energized certain contacts will be operated, and means for changing the connections between the conductors and the actuating means of the contacts of said motor-controller so that as said conductors are energized a second time certain other contacts will be operated.

9. In a motor-control system, a plurality of motors, a resistance, a motor-controller having a plurality of separately-actuated contacts for varying the amount of said resistance connected in circuit with the motors so as to produce a certain number of steps during acceleration in series or during acceleration in parallel, a plurality of conductors less in number than the number of resistance steps desired to be produced in series or in parallel, said conductors being so connected that when they are first energized certain contacts will be operated, means for changing the connections between the conductors and the actuating means of the contacts of said motor-controller so that as said conductors are energized a second time certain other contacts will be operated, and means for holding in their operated position the contacts which were operated when the conductors were first energized.

10. In a system of motor control, a motor or motors, a motor-controller of the separately-actuated contact type including a plurality of resistance-varying contacts, a plurality of conductors, a master-controller for connecting one of said conductors to a source of current-supply a number of times during the acceleration of the motors, and means for connecting said conductor to the actuating means of certain of the resistance-varying contacts so as to produce a certain combination of said contacts when the conductor is first energized and for changing said connections so that a different combination of the contacts will be produced when the conductor is energized a second time.

11. In a system of motor control, a plurality of motors, a motor-controller of the separately-actuated contact type including a plurality of resistance-varying contacts, a plurality of conductors, a master-controller for connecting one of said conductors to a source of current-supply a number of times during the acceleration of the motors, and auxiliary switches operatively connected to one or more of said contacts for connecting one of said conductors to the actuating means of one or more of said contacts and then breaking said connection and connecting said conductor to the actuating means of another contact or contacts so that the successive energizations of said conductor will produce different combinations of contacts and consequently different resistance steps during the acceleration of the motors.

12. In a motor-control system, a plurality of motors, a motor-controller of the separately-actuated contact type, a master-controller for said motor-controller adapted to control the successive energizations of the contacts of said motor-controller to produce a certain number of resistance steps during the acceleration in series and in parallel, and means whereby the second energization of one of the conductors leading from the master to the motor controller during the acceleration of the motors causes a different combination of the resistance-contacts from that obtained when the conductor is first energized whereby a greater number of resistance steps is obtained than that corresponding to the number of conductors employed.

13. In combination, a controller comprising a plurality of separately-actuated contacts, means for actuating said contacts, a master-controller, a system of conductors leading therefrom to certain of the actuating means of said controller-contacts, and means for disconnecting the aforesaid actuating means from said system of conductors and connecting others in place thereof.

14. A control system for the separately-actuated contacts of a controller, comprising a master-controller, conductors leading therefrom to the actuating means of certain of the controller-contacts, means for maintaining the contacts after they have been actuated, and means for connecting said conductors to the actuating means of other of the controller-contacts.

15. In combination, a controller comprising a plurality of separately-actuated contacts, a master-controller, a control system operatively connecting the said master-controller with one or more of said contacts, and means whereby the said control system may be utilized for the operation of other controller-contacts.

16. In combination, a controller comprising a plurality of separately-actuated contacts, a master-controller, a control system operatively connecting said master-controller with one or more of said contacts, and means for operatively connecting the said control system to other contacts after the first-mentioned contacts have been operated.

17. A control system for the separately-actuated contacts of a controller, comprising conductors connected to the operating means of certain of the controller-contacts, means for maintaining the said contacts after they have been operated, means for connecting said conductors to the operating means of other of the controller-contacts, and a master-controller for controlling the operation of the above-specified means.

18. In combination, a controller comprising a plurality of groups of separately-actuated contacts, a control system constructed and arranged to secure the operation of the contacts of one group, and means for operatively connecting said control system to another group of contacts.

19. In combination, a controller comprising a plurality of groups of separately-actuated contacts, a control system constructed and arranged to secure the operation of the contacts of one group, and means arranged to be operated with the last contact of the first group for operatively connecting said control system to another group of contacts.

20. In combination, a controller comprising a plurality of groups of separately-actuated contacts, actuating-coils for said contacts, a master-controller, conductors leading therefrom to the actuating-coils of the contacts of the first group, and means for shifting the connections of one or more of said conductors to the actuating-coils of the contacts of another group.

21. In combination, a controller comprising a plurality of groups of separately-actuated contacts, a control system operatively connected to the contacts of the first group, means for maintaining the contacts of the first group after they have been actuated, and means for operatively connecting said control system to the contacts of another group.

22. In combination, a controller comprising a plurality of separately-actuated contacts, actuating-coils for said contacts, a system of conductors connected to certain of the actuating-coils, means for disconnecting the aforesaid actuating-coils from said system of conductors and connecting others in place thereof, and a master-controller constructed and arranged to first supply current to the system of conductors to energize the actuating-coils normally connected thereto, then to operate the connecting and disconnecting means and finally to again supply current to said system of conductors to energize the other actuating-coils.

23. In combination, a controller comprising a plurality of groups of separately-actuated contacts, actuating-coils for said contacts, a system of conductors through which current is supplied to the several actuating-coils, electromagnetically-actuated means for shifting the connections of certain of said conductors from the actuating-coils of one group to the actuating-coils of another group of contacts, and a master-controller having its contacts arranged to supply current through the system of conductors to actuate the contacts of the first group, then to complete a maintaining-circuit for said contacts when actuated and then to shift the connection of certain of the conductors of the said system of conductors to other actuating-coils so that by a further movement of the master-controller the contacts of another group may be operated.

24. In combination, a controller of the separately-actuated contact type, a master-controller for said controller, means for connecting said master-controller to certain of the contact-actuating means of said controller for breaking said connections and for connecting other contact-actuating means to said master-controller, and means for connecting said master-controller so as to maintain in their operated position the contacts already operated.

25. In combination, a controller of the separately-actuated contact type, an operating-switch for connecting the actuating-coils of certain of the controller-contacts to a source of current-supply, means for maintaining said contacts in their operated position when operated by said operating-switch, and means for connecting said operating-switch to the actuating-coils of other of said contacts.

26. In combination, a controller of the separately-actuated contact type, an operating-switch for connecting the actuating-coils of certain of the controller-contacts to a source of current-supply, means for completing a maintaining-circuit through the actuating-coils of the contacts actuated by said operating-switch, and means operated directly after the maintaining-circuit is completed for connecting said operating-switch to the actuating-coils of other of said contacts.

27. In combination, a controller of the separately-actuated contact type, an operating-switch for connecting the actuating-coils of certain of the motor-controller contacts to a source of current-supply, a maintaining-switch for completing a maintaining-circuit through said actuating-coils, and an electromagnetically-actuated relay for connecting said operating-switch to the actuating-coils of other of said contacts, the actuating-coil of said relay being connected in the maintaining-circuit.

28. In a train-control system, a plurality of controllers each having a plurality of separately-actuated contacts, a master-controller, a control system connecting said master-controller with corresponding contacts in the several controllers, and means whereby the said control system may be utilized for the operation of other corresponding contacts in the several controllers.

29. In a train-control system, a plurality of controllers each comprising a plurality of groups of separately-actuated contacts, a control system constructed and arranged to secure the simultaneous operation of corresponding contacts in corresponding groups of controller-contacts, and means for operatively connecting said control system to secure the simultaneous operation of corresponding contacts in other corresponding groups in said controllers.

30. In a train-control system, a plurality of controllers of the separately-actuated contact type, a plurality of train-conductors, a master-controller connected with said train-conductors, and means for connecting said train-conductors to certain of the contact-actuating means of each controller, for breaking said connections and for again connecting said train-conductors to other contact-actuating means of each controller.

31. In a train-control system, a plurality of controllers of the separately-actuated contact type, a plurality of train-conductors, a master-controller connected with certain of said train-conductors, and means for connecting said certain train-conductors to certain of the contact-actuating means of each controller, for breaking said connections and for again connecting said train-conductors to other contact-actuating means of each controller, said master-controller being constructed and arranged to maintain in their operated position through the remaining train conductor or conductors the contacts already operated after their actuating means have been disconnected from the first-mentioned train-conductors.

32. In a train-control system, a plurality of train-wires, a plurality of motor-controllers of the separately-actuated contact type, each controller having a plurality of groups of resistance-varying electromagnetically-actuated contacts, a controlling-switch for connecting the actuating-coils of the contacts of a certain group in each of said motor-controllers successively in circuit through certain of said train-wires, and an electromagnetically-actuated relay for each motor-controller for connecting the same train-wires which were previously used to operate the contacts of said group to the actuating-coils of the contacts of the next group so that the contacts of the latter group will be operated successively when said controlling-switch is moved through its operative positions a second time.

33. In a train-control system, a plurality of train-wires, a plurality of motor-controllers of the separately-actuated contact type, each controller having a plurality of groups of resistance-varying electromagnetically-actuated contacts, a controlling-switch for connecting the actuating-coils of the contacts of a certain group in each of said motor-controllers successively in circuit through certain of said train-wires, an electromagnetically-actuated relay for each motor-controller for connecting the same train-wires which were previously used to operate the contacts of said group to the actuating-coils of the contacts of the next group so that the contacts of the latter group will be operated successively when said controlling-switch is moved through its operative positions a second time, and means for completing a maintaining circuit or circuits through the actuating-coils of the operated contacts of the previous group so as to maintain said contacts in their operated position during the time that the contacts in the succeeding group or groups are being operated.

In witness whereof I have hereunto set my hand this 22d day of September, 1903.

FRANK E. CASE.

Witnesses:
   G. C. HOLLISTER,
   HELEN ORFORD.